(12) United States Patent
Nguyen

(10) Patent No.: US 12,321,920 B2
(45) Date of Patent: Jun. 3, 2025

(54) METHOD FOR TOKENIZATION OF INFORMATION ASSOCIATED WITH A PAYMENT CARD

(71) Applicant: MK GROUP JSC, Hanoi (VN)

(72) Inventor: Khang Trong Nguyen, Hanoi (VN)

(73) Assignee: MK GROUP JSC, Hanoi (VN)

( * ) Notice: Subject to any disclaimer, the term of this patent is extended or adjusted under 35 U.S.C. 154(b) by 0 days.

(21) Appl. No.: 17/944,886

(22) Filed: Sep. 14, 2022

(65) Prior Publication Data

US 2024/0086893 A1 Mar. 14, 2024

(51) Int. Cl.
*G06Q 20/40* (2012.01)
*G06Q 20/34* (2012.01)
*H04L 9/32* (2006.01)
*H04L 9/40* (2022.01)

(52) U.S. Cl.
CPC ....... *G06Q 20/341* (2013.01); *G06Q 20/4018* (2013.01); *H04L 9/3213* (2013.01); *G06Q 2220/00* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 10,380,583 | B1* | 8/2019 | Ellis | G06Q 20/382 |
| 10,579,975 | B2* | 3/2020 | Coffman | G06Q 20/102 |
| 10,621,563 | B1* | 4/2020 | Spindel | G06Q 20/322 |
| 11,405,189 | B1* | 8/2022 | Bennison | H04L 9/0656 |
| 11,748,741 | B2* | 9/2023 | Rutherford | G06Q 20/385 |
| | | | | 705/72 |
| 2003/0226901 | A1* | 12/2003 | Kim | G06K 19/0775 |
| | | | | 235/492 |
| 2011/0137802 | A1* | 6/2011 | Spies | G06Q 20/20 |
| | | | | 705/65 |
| 2015/0019443 | A1* | 1/2015 | Sheets | G06Q 20/3829 |
| | | | | 705/71 |
| 2016/0162883 | A1* | 6/2016 | Liscia | G06Q 20/363 |
| | | | | 705/71 |
| 2019/0180275 | A1* | 6/2019 | Safak | H04L 9/3247 |
| 2019/0318347 | A1* | 10/2019 | Aguiar | G06Q 20/10 |

* cited by examiner

*Primary Examiner* — Bennett M Sigmond
*Assistant Examiner* — Bhavin D Shah
(74) *Attorney, Agent, or Firm* — HSML P.C.

(57) ABSTRACT

A method for tokenization of information associated with a payment card includes: transmitting a registration request including a primary account number (PAN) of the payment card to a server; sending, by the server, a request for a secure element (SE) package that includes a payment token and a payment-token-key to an issuer server, the payment token being a surrogate value of the PAN; and in response to receipt of the SE package from the issuer server, transmitting the SE package to an electronic card to be stored therein.

10 Claims, 4 Drawing Sheets

METHOD FOR TOKENIZATION OF INFORMATION ASSOCIATED WITH A PAYMENT CARD

FIELD

The disclosure relates to a method for tokenization of information associated with a payment card, and storing the resulting token in an electronic card.

BACKGROUND in the field of data security, tokenization is the process of encoding important sensitive information (e.g., personal information) to create non-sensitive substitute (also known as a token) that is seemingly unimportant. Using the technique of tokenization in the field of credit card payment, the information associated with a credit card (e.g., a primary account number (PAN), a name of the card holder, an expiry date, etc.) may be encoded into a token in the form of a string of characters/numbers, which cannot be simply read to obtain the encoded information. The token is then used to be transmitted among many parties without leaking the information associated with the credit card.

Nowadays, with the advancement of mobile devices, a number of different digital payment methods have been developed in addition to the conventional cash and credit cards. A number of companies have created various payment methods, many being associated with a mobile device and a credit card of a user (e.g., Apple Pay, Android Pay, etc.).

A secure element (SE) usually refers to a microprocessor chip that stores personal information and a secure application therein.

SUMMARY

Therefore, one object of the disclosure is to provide a method for tokenization of information associated with a payment card. The method is implemented using a server, a user electronic device communicating with the server, the payment card that belongs to a user and that stores information associated with the payment card, and an electronic card that belongs to the user and that includes a microchip for storing information. The method includes the steps of:
a) generating, by the user electronic device, a registration request associated with the payment card, the registration request including at least a primary account number (PAN) of the payment card;
b) in response to receipt of the registration request sent from the user electronic device, extracting, by the server, the PAN of the payment card included in the registration request, and identifying, by the server, an issuer bank that issued the payment card;
c) sending, by the server, a request to an issuer server that is associated with the issuer bank, the request being to request for a secure element (SE) package that includes a payment token, a payment-token-key and a card security code (CSC) of the payment card, the payment token being a surrogate value of the PAN, the payment-token-key including at least one encrypted string, each of said at least one encrypted strings containing information related to one of the user, the payment card and the user electronic device;
d) in response to receipt of the SE package from the issuer server, transmitting, by the server, the SE package to the user electronic device; and
e) by the user electronic device, establishing communication with the electronic card, and transmitting the SE package to the electronic card to be stored in the microchip of the electronic card.

In embodiments, the user electronic device and the electronic card stored with the SE package are configured to initiate a payment process, with the electronic card substituting for the role of the payment card, and the payment token serving as the PAN to be used in the payment process.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
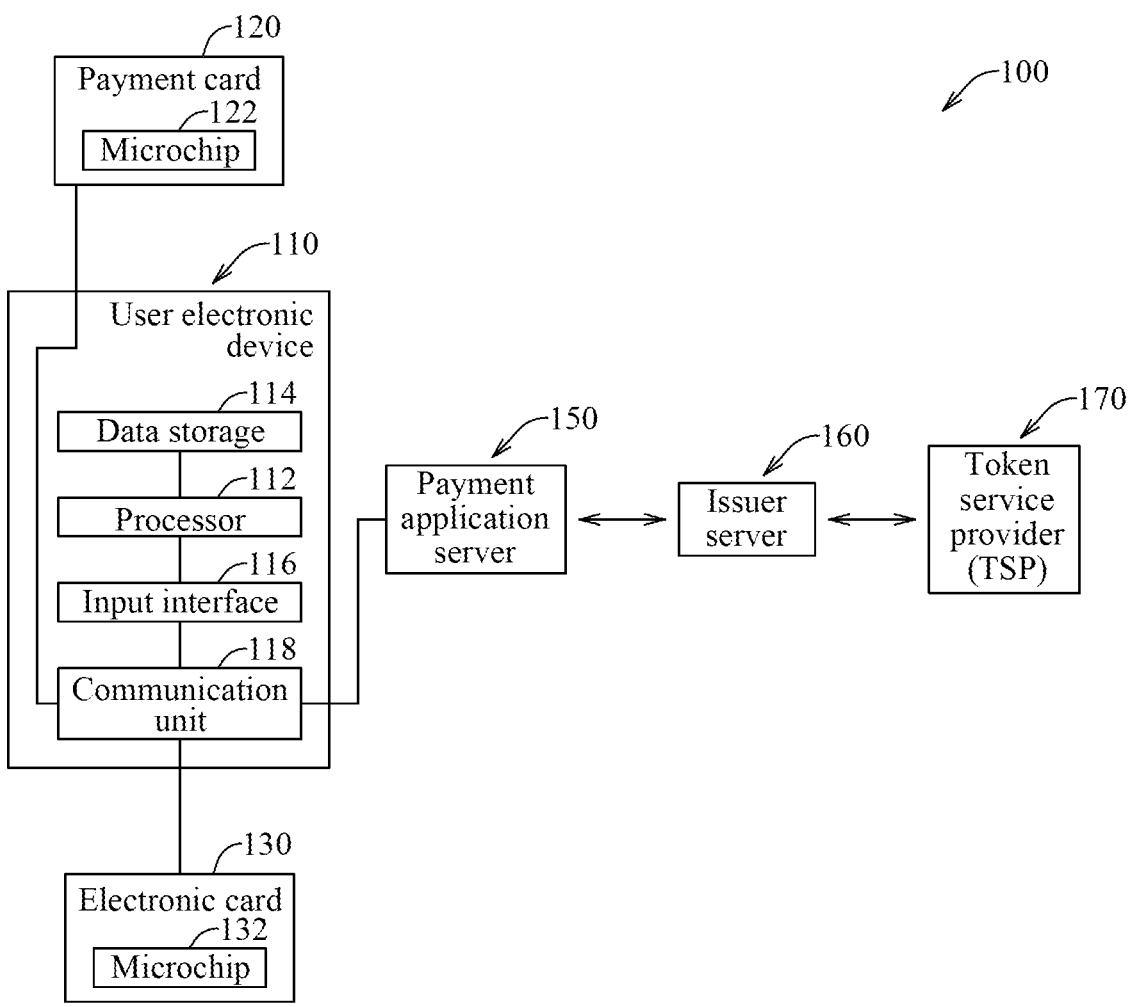
FIG. 1 is a block diagram of a system for performing tokenization according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram of a system 100 for performing tokenization according to one embodiment of the disclosure. Throughout the disclosure, the term "tokenization" refers to a process for encoding information and generating relevant data associated with the information (which may be referred to as a token).

The system 100 includes a payment application server 150, an issuer server 160 and a token service provider (TSP) 170.

In embodiments, each of the payment application server 150, the issuer server 160 and the TSP 170 may be embodied using a server device that includes a processor, a data storage and a communication unit.

The processor of each of the payment application server 150, the issuer server 160 and the TSP 170 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage of each of the payment application server 150, the issuer server 160 and the TSP 170 may be embodied using, for example, random access memory (RAM), read only memory (ROM), programmable ROM (PROM), firmware, and/or flash memory, etc. The data storage may store appropriate software application that includes instructions that, when executed by the processor, perform operations as described below.

The communication unit of each of the payment application server 150, the issuer server 160 and the TSP 170 may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fifth generation (5G) of wireless mobile telecommunications technology, and the like.

In this embodiment, the payment application server 150 is configured to communicate with the issuer server 160 and a user electronic device 110. The issuer server 160 is configured to communicate with the payment application server 150 and the TSP 170.

The issuer server 160 is associated with a bank. It is noted that in other embodiments, a plurality of issuer servers 160, each associated with a specific bank, may be present. In such cases, each of the issuer servers 160 is configured to communicate with the payment application server 150 and the TSP 170.

The TSP 170 is associated with an entity that is trusted for generating a token, such as a bank, a payment network, or an independent company. The term "payment network" may refer to a network infrastructure of an interconnected payment intermediary (such as Visa Inc., MasterCard Inc., NAPAS, etc.) for communication among a plurality of servers of various banks. The payment network enables communication among the bank servers and the TSP 170.

The user electronic device 110 may be embodied using a smart phone, a tablet, or other portable electronic devices. The user electronic device 110 includes a processor 112, a data storage 114, an input interface 116 and a communication unit 118.

The processor 112, the data storage 114 and the communication unit 118 may be embodied using the components that are similar to the processor, the data storage and the communication unit of the payment application server 150, respectively. The input interface 116 may be embodied using a touchscreen.

The data storage 114 stores a software application that, when executed by the processor 112, causes the processor 112 to perform operations as described below.

In use, a user holding the user electronic device 110, a payment card 120 and an electronic card 130 may operate the user electronic device 110 to initiate tokenization of the information associated with the payment card 120.

In embodiments, the payment card 120 may be a credit card, a debit card, or other cards issued by an issuer bank. The payment card 120 includes a microchip 122 that stores information associated with the payment card 120, such as a primary account number (PAN), a name of the user, an expiry date, etc.

The electronic card 130 includes a microchip 132, and may be a chip-based citizenship card (that is, an electronic identification card issued to a citizen or a national), or other electronic cards. The electronic card 130 is configured to communicate with the user electronic device 110 using, for example, near field communication (NFC). The microchip 132 may store a card number associated with an owner of the electronic card 130 (which in this case is also the user of the user electronic device 110). It is noted that in the case of an electronic identification card issued to a citizen/national, the card number may be a national identification number (e.g., a 12-digit Vietnamese ID card number) of the owner of the electronic card 130.

Figure 2:
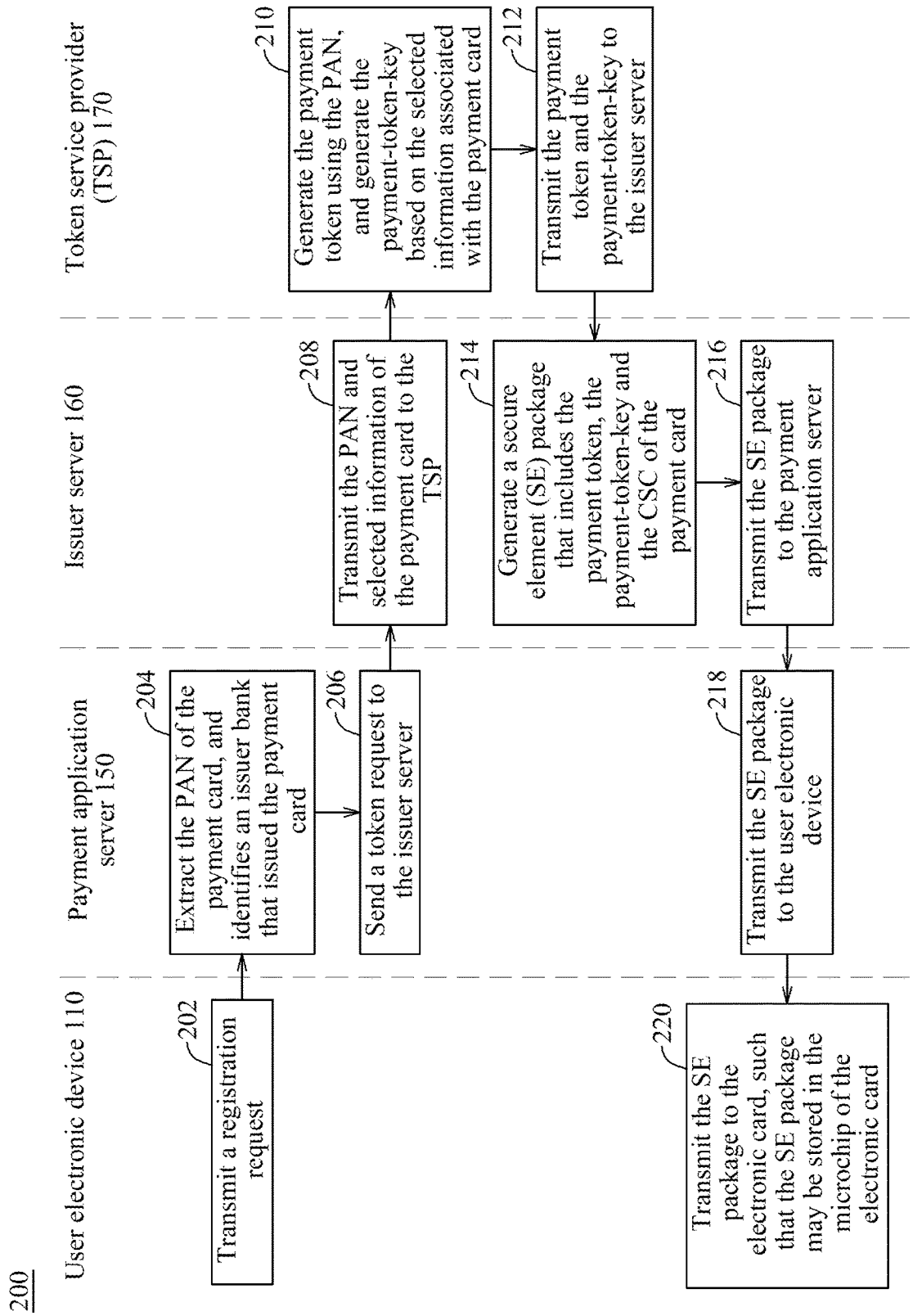
FIG. 2 is a flow chart illustrating steps of a method for tokenization of information associated with a payment card and storing the resulting token in an electronic card, according to one embodiment of the disclosure.

FIG. 2 is a flow chart illustrating steps of a method 200 for tokenization of information associated with the payment card 120 and storing the resulting token in the electronic card 130 according to one embodiment of the disclosure. In this embodiment, the method 200 is implemented using the system 100 of FIG. 1.

The method 200 may be initiated by the user operating the user electronic device 110 to communicate with the payment application server 150. In use, the processor 112 of the user electronic device 110 may execute a software application provided by the payment application server 150, or access a website associated with the payment application server 150.

In step 202, the processor 112 transmits a registration request to the payment application server 150. Content of the registration request may be inputted by the user, and includes the PAN of the payment card 120, and additional information associated with the payment card 120 (e.g., the name of the card holder, the expiry date, and/or a card security code (CSC) (such as a three digit card verification value (CVV)), etc.). In some embodiments, the registration request may further include a device manufacturer identifier that is associated with a manufacturer of the user electronic device 110.

In response to receipt of the registration request sent from the user electronic device 110, in step 204, the payment application server 150 extracts the PAN of the payment card 120 included in the registration request, and identifies an issuer bank that issued the payment card 120 based on the PAN.

Afterward, in step 206, the payment application server 150 sends a token request to one of the issuer servers 160 that is associated with the issuer bank that issued the payment card 120 (hereinafter simply "the issuer server 160"). The token request includes the PAN and the additional information associated with the payment card 120. In some embodiments, the token request may further include the device manufacturer identifier. The token request is to request for a secure element (SE) package that includes a payment token, a payment-token-key, and the CSC of the payment card 120.

Specifically, the payment token is a surrogate value of the PAN (i.e., a value that is generated from and different from the PAN) to be used in subsequent operations. The payment-token-key is to be generated by the TSP 170, and includes one or more encrypted strings that are related to information of the user, the payment card 120 and/or the user electronic device 110.

In one example, specific data to be transmitted in the subsequent operations may be referred to as "key(s)" shown in the following Table 1. The content of the payment-token-key may include one or more of the keys.

TABLE 1

| Key | Value | Description |
| --- | --- | --- |
| ApplicationPAN | String | PAN of the payment card |
| ApplicationExpirationDate | Date as a string | Expiry date, in the format of YYMMDD |
| CardHolderName | String | Name of the cardholder |

TABLE 1-continued

| Key | Value | Description |
| --- | --- | --- |
| DeviceManufacturerIdentifier | String | Device manufacturer identifier (in Hex value) |

It is noted that during the operations included in the disclosure, selected information transmitted among different entities may be in the form of key(s) Some examples of these keys are listed in the following Table 2.

TABLE 2

| Key | Value | Description |
| --- | --- | --- |
| CurrencyCode | String | Currency code as specified in ISO4217 |
| TransactionAmount | Number | An amount of a transaction |
| CardHolderName | String | Name of the cardholder |
| DeviceManufacturerIdentifier | String | Device manufacturer identifier (in Hex value) |
| PaymentDataType | String | One of "3Dsecure" and "EMV" |
| PaymentData |  | Detailed payment data |

Then, in step 208, the issuer server 160 transmits the PAN and the selected information of the payment card 120 to the TSP 170. In some embodiments, the issuer server 160 may further transmit the device manufacturer identifier to the TSP 170.

In step 210, the TSP 170 then generates the payment token using the PAN, and generates the payment-token-key based on the selected information associated with the payment card 120. The generation of the payment token and the payment-token-key may be done by executing an existing encrypting algorithm, and details thereof are omitted herein for the sake of brevity.

In step 212, the TSP 170 transmits the payment token and the payment-token-key to the issuer server 160.

In response to receipt of the payment token and the payment-token-key from the TSP 170, in step 214, the issuer server 160 generates a secure element (SE) package that includes the payment token, the payment-token-key and the CSC of the payment card 120 (which is stored in the issuer server 160). The CSC may be a three- or four-digit number.

Then, in step 216, the issuer server 160 transmits the SE package to the payment application server 150, and in step 218, the payment application server 150 transmits the SE package to the user electronic device 110.

Then, in step 220, the user may operate the user electronic device 110 to interact with the electronic card 130. For example, the user may place the electronic card 130 near the user electronic device 110, such that the user electronic device 110 is capable of communicating with the electronic card 130 using NFC. Alternatively, the user may insert the electronic card 130 into a card reader (not depicted in the drawings) that is connected to the user electronic device 110. After a communication between the user electronic device 110 and the electronic card 130 is established, the user may operate the user electronic device 110 to transmit the SE package to the electronic card 130, such that the SE package may be stored in the microchip 132 of the electronic card 130.

As such, the method for tokenization is completed. The user electronic device 110 and the electronic card 130 stored with the SE package are configured to initiate a payment process, with the electronic card 130 substituting for the role of the payment card 120, and the payment token serving as the PAN to be used in the payment process.

In use, the user electronic device 110 may perform several different digital payment methods associated with a payment card 120 (e.g., Apple Pay, Android Pay, etc.). It is noted that in many cases, the user may own a plurality of payment cards 120. Therefore, it may be desirable to generate a token for each of the payment cards 120, and store the resulting tokens respectively for the payment cards 120 at the same location (the electronic card 130 in this case). As such, the user may bring only the electronic card 130 and not the payment cards 120 with him/her, and take out the electronic card 130 for making payment using any of the payment cards 120.

Figure 3:
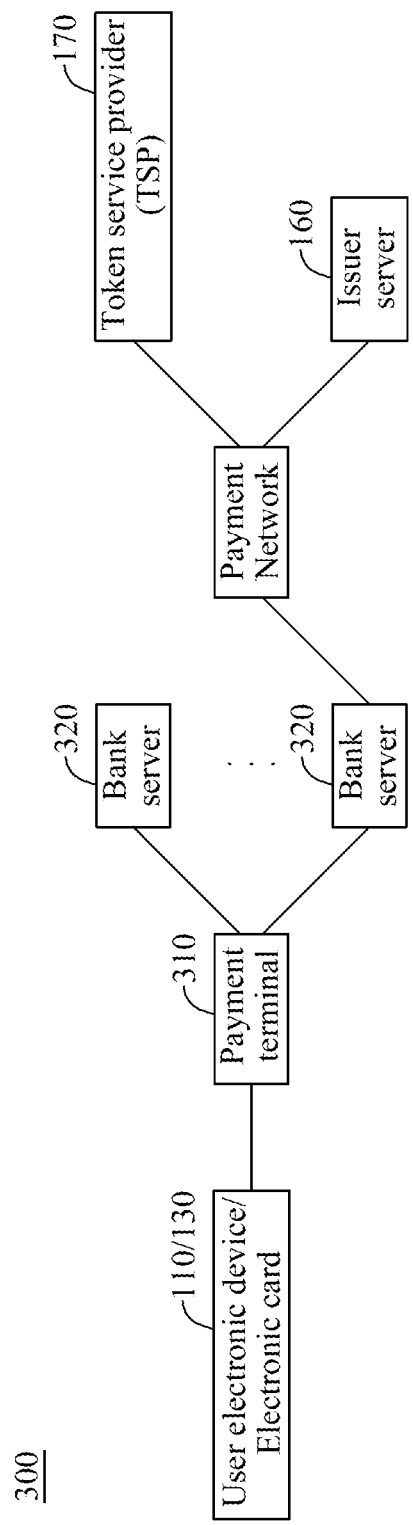
FIG. 3 is a block diagram illustrating a digital payment system for performing a payment process according to one embodiment of the disclosure.

FIG. 3 is a block diagram illustrating a digital payment system 300 for performing a payment process according to one embodiment of the disclosure.

As shown in FIG. 3, the user may operate the user electronic device 110 to interact with a payment terminal 310. In some embodiments, the payment terminal 310 may be embodied using a point-of-sale device (which may be disposed in an actual brick-and-mortar store) that includes a contactless card reader for a transaction of purchasing an item in the brick-and-mortar store. In other embodiments, the payment terminal 310 may be embodied using an online payment gateway server associated with an online merchant for a transaction of purchasing an item via the online merchant. The digital payment system 300 further includes a number of bank servers 320 each associated with a bank, and a payment network that connects the bank servers 320, the issuer server 160 and the TSP 170.

Figure 4:
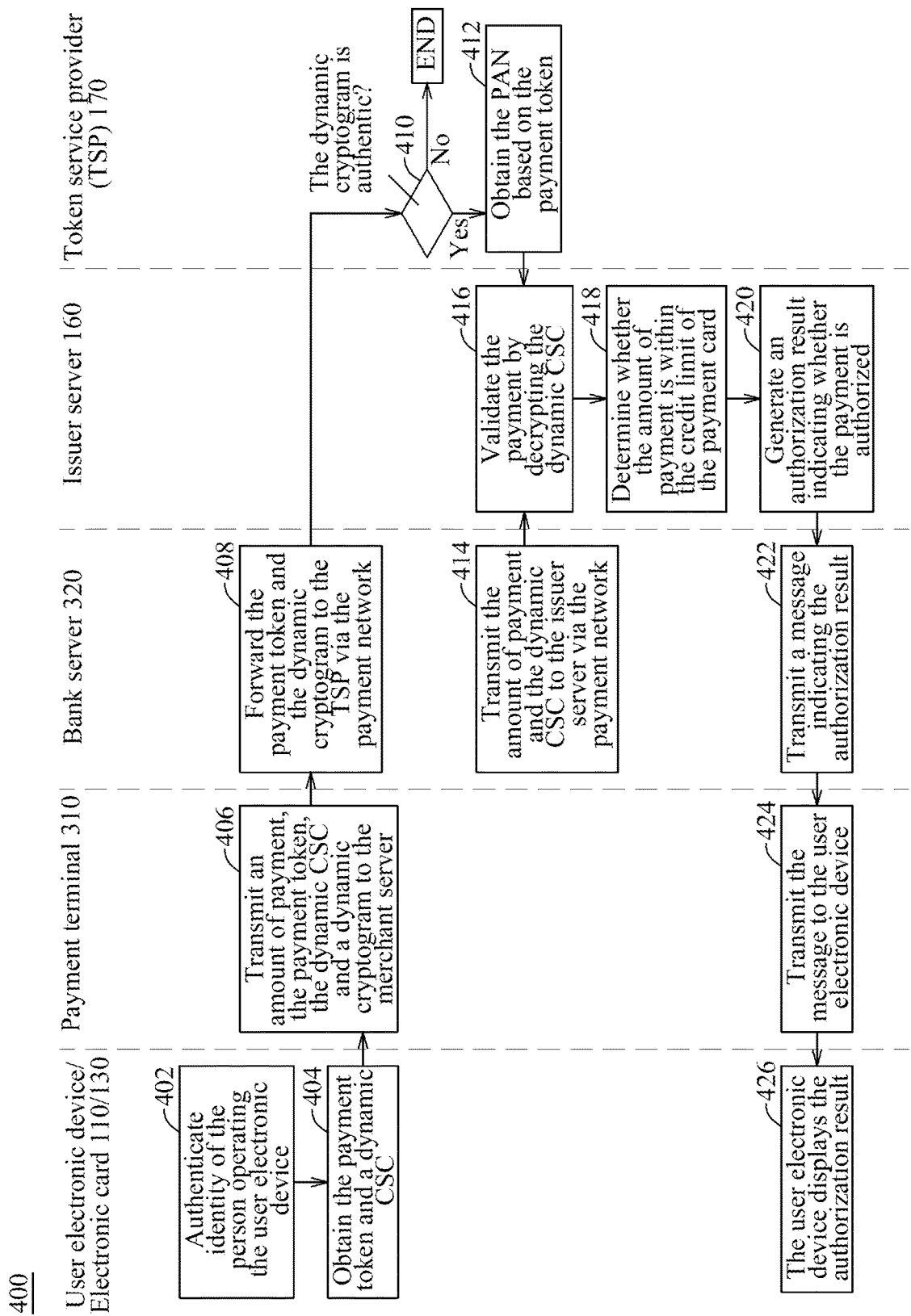
FIG. 4 is a flow chart illustrating steps of a payment process using the electronic card according to one embodiment of the disclosure.

FIG. 4 is a flow chart illustrating steps of a payment process 400 using the electronic card 130 according to one embodiment of the disclosure. In this embodiment, the payment process 400 is implemented using the digital payment system 300 of FIG. 3.

The payment process 400 may be initiated by the user operating the user electronic device 110 to communicate with the payment terminal 310. In use, the processor 112 of the user electronic device 110 may execute the software application provided by the payment application server 150.

It is noted that, in some embodiments, prior to initiating the payment process 400, a binding process that binds the payment card 120 and the electronic card 130 to the user electronic device 110 may be implemented. The binding process may involve the user operating the user electronic device 110 to execute a software application associated with the payment network, and, under the instructions or guidance provided by the software application, performing actions necessary to bind the payment card 120 and the electronic card 130 to the user electronic device 110. Since the binding process is readily known in the related art, the details thereof are omitted herein for the sake of brevity.

In step 402, the user electronic device 110 performs an authentication process with respect to a user of the user electronic device 110, so as to authenticate identity of the person operating the user electronic device 110. In use, the authentication process may involve instructing the holder to input a personal identification number (PIN), or use biometric authentication (such as facial recognition, fingerprint recognition, etc.) or other authentication techniques. After it is determined that the user of the user electronic device 110 is authentic, the processor 112 is configured to carry out the rest of the payment process. Otherwise, the payment process is terminated.

In step 404, the processor 112 generates an instruction for the user to operate the user electronic device 110 to interact with the electronic card 130, so as to obtain the payment token and a dynamic CSC, which is a number generated from the CSC, from the microchip 132 of the electronic card 130. In embodiments, the electronic card 130 may communicate with the user electronic device 110 via NFC or a card reader. It is noted that in the case that the user is not authenticated in step 402, the user electronic device 110 is not enabled to access the data stored in the microchip 132.

In embodiments, the dynamic CSC refers to a unique one-time code that replaces the CSC in the payment process, and is only valid for the particular payment process. The dynamic CSC may be generated by the microchip 132 using an algorithm stored in the microchip 132, or using an application installed in the user electronic device 110 and transmitted to the microchip 132. In some embodiments, the dynamic CSC is encrypted using the CSC and a public key, and is able to be decrypted using a private key stored in the issuer server 160. In this manner, when a dynamic CSC is received by the issuer server 160, the issuer server 160 may be configured to determine whether the dynamic CSC is actually generated using a valid CSC.

After obtaining the payment token and the dynamic CSC, the user electronic device 110 transmits the same to the payment terminal 310. The user electronic device 110 may communicate with the payment terminal 310 via NFC (in the case of a brick-and-mortar store) or via a network such as the Internet (in the case of an online purchase).

It is noted that in other embodiments, additional information may be transmitted by the user electronic device 110 to the payment terminal 310, and is not limited as described above. For example, in this embodiment, a dynamic one-time unique number (also known in the related art as a "dynamic cryptogram") is further transmitted to the payment terminal 310. The dynamic cryptogram may be generated by encrypting specific information that identifies the user using a public key, and is able to be decrypted using a private key stored in the TSP 170. In this manner, when a dynamic cryptogram is received by the TSP 170, the TSP 170 may be able to determine whether the dynamic cryptogram is actually generated from the information related to the user.

Afterward, the payment terminal 310 initiates a verification procedure for verifying the payment token and the dynamic CSC via the payment network. In this embodiment, the verification procedure includes the following steps.

Specifically, in step 406, the payment terminal 310 transmits an amount of payment, the payment token, the dynamic CSC and the dynamic cryptogram to one of the bank servers 320 that serves as a merchant server. The merchant server is associated with a bank that handles the payment process, and may be embodied in a manner similar to that of the issuer server 160.

Then, in step 408, the merchant server forwards the payment token and the dynamic cryptogram to the TSP 170 via the payment network.

In step 410, in response to receipt of the payment token and the dynamic cryptogram, the TSP 170 determines whether the dynamic cryptogram is authentic by decrypting the dynamic cryptogram using a private key associated with the public key. It is noted that the operations regarding encryption and decryption using the public and private keys are readily known in the related art, and details thereof are omitted herein for the sake of brevity.

After it is determined that the dynamic cryptogram is authentic, in step 412, the TSP 170 obtains the PAN based on the payment token. Specifically, the TSP 170 may look up the PAN stored therein that is associated with the payment token received. Then, the TSP 170 transmits the PAN to the issuer server 160 via the payment network. In the case that it is determined that the dynamic cryptogram is inauthentic, the TSP 170 may generate an error message and transmit the error message to the merchant server via the payment network, and the process is terminated.

In step 414, the merchant server transmits the amount of payment and the dynamic CSC to the issuer server 160 via the payment network.

In response to receipt of the PAN (in step 412) and the amount of payment and the dynamic CSC (in step 414), in step 416, the issuer server 160 first validates the payment by decrypting the dynamic CSC. After it is determined that the decrypted dynamic CSC is authentic (i.e., is generated from the actual CSC of the payment card 120), in step 418, the issuer server 160 checks a credit limit of the payment card 120 to determine whether the amount of payment is within the credit limit of the payment card 120.

Afterward, in step 420, the issuer server 160 generates an authorization result indicating whether the payment is authorized. Specifically, the payment is authorized when the dynamic CSC is deemed to be authentic and the amount of payment is within the credit limit of the payment card 120. At this stage, the amount of payment may be added to a balance of the payment card 120. On the other hand, when the dynamic CSC is not authentic or the amount of payment exceeds the credit limit of the payment card 120, the payment is not authorized. The authorization result is then transmitted to the merchant server via the payment network.

In response to receipt of the authorization result, in step 422, the merchant server transmits a message indicating the authorization result (e.g., verification (of the payment token and the dynamic CSC) is successful) to the payment terminal 310, and in turn, in step 424, the payment terminal 310 transmits the message to the user electronic device 110. In response to receipt of the message from the payment terminal 310, in step 426, the user electronic device 110 displays the authorization result. Then, the payment process is completed.

To sum up, embodiments of the disclosure provide a method for tokenization of data stored in a payment card 120, and for storing the resulting token (i.e., the SE package) in the electronic card 130. As such, the electronic card 130, instead of the payment card 120, may be used with the user electronic device 110 to implement the payment process as described above. As such, the payment card 120 can be left out of the payment process. This configuration may be particularly helpful in the case that a user owns multiple payment cards since the associated data may all be integrated into a single electronic card 130.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for tokenization of information associated with a payment card, the method being implemented using a server, a user electronic device communicating with the server, the payment card that belongs to a user and that stores information associated with the payment card, and an electronic card that belongs to the user and that includes a microchip for storing information, the method comprising:
   a) generating, by the user electronic device, a registration request associated with the payment card, the registration request including at least a primary account number (PAN) of the payment card, and a device manufacturer identifier that is associated with a manufacturer of the user electronic device;
   b) in response to receipt of the registration request sent from the user electronic device, extracting, by the server, the PAN of the payment card included in the registration request, and identifying, by the server, an issuer bank that issued the payment card;
   c) sending, by the server, a request to an issuer server that is associated with the issuer bank, the request being to request for a secure element (SE) package, the SE package being generated by the issuer server and including a payment token, a payment-token-key and a card security code (CSC) of the payment card, the payment token being a surrogate value of the PAN, the payment-token-key including at least one encrypted string, each of said at least one encrypted strings containing information related to one of the user, the payment card and the user electronic device, wherein the request includes the device manufacturer identifier;
   d) in response to receipt of the SE package from the issuer server, transmitting, by the server, the SE package to the user electronic device; and
   e) by the user electronic device, establishing communication with the electronic card, and transmitting the SE package to the electronic card to be stored in the microchip of the electronic card,
   wherein the user electronic device and the electronic card stored with the SE package are configured to initiate a payment process, with the electronic card substituting for the role of the payment card, and the payment token serving as the PAN to be used in the payment process;
   wherein the electronic card is a chip-based citizenship card;
   wherein the payment process includes:
      f1) performing, by the user electronic device, an authentication process to authenticate a user of the user electronic device;
      f2) after the user of the user electronic device has been authenticated, operating the user electronic device that communicates with the electronic card to communicate with a payment terminal, so as to transmit the payment token and a dynamic CSC to the payment terminal, the dynamic CSC being a number generated from the CSC;
      f3) by the payment terminal, initiating a verification procedure for verifying the payment token and the dynamic CSC via a payment network; and
      f4) after the payment token and the dynamic CSC have been verified, transmitting, by the payment terminal to the user electronic device, a message indicating that the payment has been authorized.

2. The method of claim 1, wherein the authentication process includes using one of a personal identification number (PIN), facial recognition and fingerprint recognition for authenticating the holder of the user electronic device.

3. The method of claim 1, wherein in f2), the user electronic device further transmits a dynamic cryptogram to the payment terminal.

4. The method of claim 3, wherein in f2), the dynamic CSC is encrypted using the CSC and is able to be decrypted using a private key stored in the issuer server.

5. The method of claim 4, wherein f3) includes:
   transmitting, by the payment terminal, an amount of the payment, the payment token, the dynamic CSC and the dynamic cryptogram to a merchant server associated with a bank;
   forwarding, by the merchant server, the payment token and the dynamic cryptogram to a token service provider (TSP) via the payment network so as to enable the TSP to obtain the PAN and to transmit the PAN to the issuer server via the payment network;
   transmitting, by the merchant server, the amount of payment and the dynamic CSC to the issuer server via the payment network, and receiving an authorization result indicating whether the payment is authorized; and
   when it is determined that the payment is authorized, sending, by the merchant server, a message to the payment terminal indicating that the payment token and the dynamic CSC have been verified.

6. The method of claim 1, further comprising, prior to step a), a binding process that binds the payment card and the electronic card to the user electronic device.

7. The method of claim 1, the method being implemented further using the issuer server and a token service provider (TSP) that communicates with the issuer server, the method further comprising, between steps c) and d):
   transmitting, by the issuer server, the PAN and selected information associated with the payment card to the TSP;
   by the TSP, generating the payment token using the PAN, and generating the payment-token-key based on the selected information associated with the payment card; and
   transmitting, by the TSP, the payment token and the payment-token-key to the issuer server.

8. The method of claim 7, further comprising:
   by the issuer server, generating the SE package in response to receipt of the payment token and the payment-token-key.

9. The method of claim 7, wherein the selected information includes a currency code as specified in ISO4217, an amount of a transaction, a name of a cardholder of the payment card, the device manufacturer identifier, a type of payment data, and detailed payment data.

10. The method of claim 1, wherein the payment-token-key includes the PAN of the payment card, an expiry date of the payment card, a name of a cardholder of the payment card, and the device manufacturer identifier.

* * * * *